United States Patent [19]
Baghdachi et al.

[11] Patent Number: 5,147,927
[45] Date of Patent: Sep. 15, 1992

[54] ROOM-TEMPERATURE, MOISTURE-CURABLE, PRIMERLESS, POLYURETHANE-BASED ADHESIVE COMPOSITION AND METHOD

[75] Inventors: Jamil Baghdachi, Northville; Keith H. Mahoney, Grosse Pointe City; Glenn E. Martin, Farmington Hills, all of Mich.

[73] Assignee: BASF Corporation, Parsippany, N.J.

[21] Appl. No.: 715,096

[22] Filed: Mar. 29, 1991

Related U.S. Application Data

[63] Continuation-in-part of Ser. No. 303,420, Jan. 27, 1989, abandoned.

[51] Int. Cl.$^5$ ................................. C08K 5/49
[52] U.S. Cl. .................... 524/710; 524/723; 524/773; 524/775; 525/440; 525/453; 525/460; 528/26; 528/28
[58] Field of Search ............... 525/440, 453, 460; 528/26, 28; 524/710, 723, 773, 775

[56] References Cited

U.S. PATENT DOCUMENTS

| | | | |
|---|---|---|---|
| 3,632,557 | 1/1972 | Brode et al. | 260/77.5 |
| 3,979,344 | 9/1976 | Bryant et al. | 260/18 TN |
| 4,575,523 | 3/1986 | Anderson et al. | 523/414 |
| 4,666,968 | 5/1967 | Downey et al. | 524/296 |
| 4,894,426 | 1/1990 | Baghdachi et al. | 528/22 |

*Primary Examiner*—Melvyn I. Marquis
*Attorney, Agent, or Firm*—Rupert B. Hurley, Jr.; Paul L. Marshall

[57] ABSTRACT

A primerless, one-component, moisture-curable polyurethane-based adhesive composition useful for affixing glass panels directly to electrocoat painted metal substrates comprises a polyurethane base polymer containing an electrocoat adhesion promoter. The sealant composition has fast cure times at ambient temperatures and forms a strong bond directly to electrocoat painted metal substrates without the need for a sealant primer.

11 Claims, No Drawings

ROOM-TEMPERATURE, MOISTURE-CURABLE, PRIMERLESS, POLYURETHANE-BASED ADHESIVE COMPOSITION AND METHOD

This is a continuation-in-part of U.S. patent application Ser. No. 303,420, filed Jan. 27, 1989, now abandoned.

This invention relates to one-component, moisture-curable polymeric sealant compositions and a method for their use. More particularly, this invention concerns one-component, moisture-curable sealant compositions which possess outstanding adherence to automotive electrocoat coatings and are thus useful as primerless window glass sealants in automotive applications.

BACKGROUND OF THE INVENTION

In the manufacture of motor vehicles, windshields and other fixed-panel windows are attached to the vehicle body by means of a polymeric sealant. In order to obtain maximum bond strength between the glass window panels and the coated vehicle body, some surface preparation of the vehicle body coating is typically required. Because the bead of window sealant material is generally applied to a vehicle body which has already been painted or otherwise coated, it is usually necessary to use a primer material to prepare the surface to receive the sealant. Once the sealant bead is applied to the coated vehicle body, the glass panel is then installed onto the vehicle so that the bead of sealant comes into firm contact with both the painted substrate surface and the glass panel. After the sealant bead has properly cured, the vehicle must pass government Motor Vehicle Safety Standards (MVSS) tests which include the crash-worthiness of the windhsield installation.

The Safety Standards provide no margin for failure of the windshield bonding system. In crash and roll-over situations, the windshield provides additional support of the vehicle roof and must remain bonded to the vehicle body.

Motor vehicles today are coated with a wide variety of paint types and coating systems. Each paint type has its unique formulation and surface characteristics, once dried. Even minor changes in the formulation of a paint may lead to adhesive failure of the bond between the window sealant material and the painted vehicle body. Typically, in the automotive industry there are frequent changes in the formulations of paints which are employed. Some of these changes are motivated by aesthetic considerations, others by more practical concerns. Changes in the paint formulation may relate to modification of solvent types or reduction in solvent content of the formulation, changes in the nature and concentration of paint additives, yearly color styling changes, and other changes dictated by the user's location and paint application requirements.

Typical coatings systems used in the automotive industry today involve the application to the vehicle body of 1) an electrocoat paint coating, 2) a primer-surfacer coating, and 3) a decorative paint coating. In some cases, notably truck bodies, the decorative coating takes the form of a pigmented topcoat. In the case of automobiles, the industry is tending toward increased use of a decorative coating made up of a thin pigmented basecoat layer which is overcoated by one or more thicker, clear, topcoat layers. So-called "metallic" color styles, which contain flakes of mica, aluminum, or other metal in the pigmented basecoat, are becoming increasingly popular.

In a typical "metallic" basecoat/clearcoat coating system, this means that there may be as many as seven interlayer interfaces between an applied bead of sealant and the underlying metal vehicle body: 1) the sealant to sealant-primer interface; 2) the sealant-primer to clear topcoat interface; 3) the clear topcoat to pigmented basecoat interface; 4) the basecoat to metallic flake interface; 5) the basecoat to primer-surfacer interface; 6) the primer-surfacer to electrocoat interface; and 7) the electrocoat to vehicle body interface. The potential exists for delamination or adhesive failure at one or more of these interfaces when stress is applied. In a practical sense, however, delamination of the electrocoat from the underlying steel vehicle body is a virtual impossibility because of the nature of the electrochemical process by which that paint layer is applied.

There is thus a need in the art for a sealant composition and sealing system which provides a direct firm, durable, weather-resistant seal between motor vehicle fixed-window glass panels and the electrocoat paint layer of the motor vehicle body.

SUMMARY OF THE INVENTION

The present invention provides, in one embodiment, a polymeric sealant composition which is useful for bonding fixed window glass panels and/or backlight glass panels to a motor vehicle body which permits application of the sealant bead directly over the electrocoat layer without the need for a sealant primer. The sealant composition of this invention eliminates the need for a sealant primer and forms a strong, durable, weather-resistant bond directly between the glass window panel and the electrocoated vehicle body. By use of the sealant composition of this invention, the number of interfaces between the metal vehicle body and sealant is reduced to two, virtually eliminating the potential for delamination of the sealant from the auto body.

The sealant composition of this invention comprises a silane-capped polyurethane base polymer and from 2.0 to 10.0 parts by weight of an aminosilane electrocoat adhesion promoter, based on 100 parts by weight of the base polyurethane polymer.

The sealant composition may further contain solvents, thixotropic agents, flexibilizing agents, fillers, and pigmenting agents to obtain the desired color, consistency, and flow characteristics.

The silane-capped polyurethane base polymer has the idealized structure:

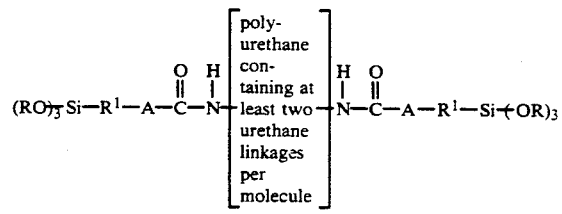

wherein R is lower alkyl of from 1 to 6 carbon atoms and $R^1$ is a divalent bridging radical selected from the group consisting of divalent hydrocarbon radicals, divalent hydrocarbon ether radicals, and divalent hydrocarbon amino radicals. The group A is selected from —S— and —$NR^2$— where $R^2$ is hydrogen or alkyl of from one to six carbon atoms.

The aminosilane adhesion promoter has the structure:

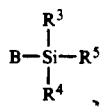

wherein $R^3$, $R^4$, and $R^5$ may be the same or different and are alkyl or alkoxyl of from one to four carbon atoms, and wherein B is at least one member selected from the group consisting of:

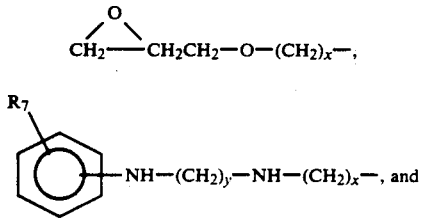

wherein $R^7$ is alkyl of one to four carbon atoms or alkylene of one to four carbon atoms; and x, y, and z each independently represents an integer of from one to six.

The present invention also relates to a process. In general, the process involves bonding an adherend directly to an electrocoated surface of a metal substrate. The process comprises first electrocoating the metal substrate by electrodepositing a resin onto the metal substrate, whereby an electrocoated metal substrate is produced. The next step of the process is to apply a one-component, moisture-curable sealant composition to at least one member selected from the group consisting of the electrocoated metal substrate and the adherend. The sealant composition comprises both a silane-terminated polyurethane polymer and an adhesion promoter. The silane-terminated polyurethane polymer is of the formula

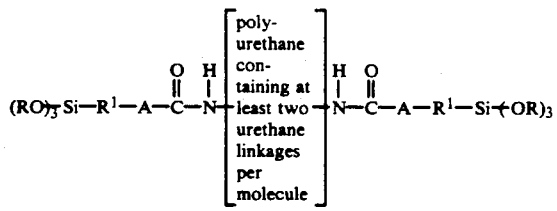

R is a lower alkyl of from 1 to 6 carbon atoms. $R^1$ is a divalent bridging radical selected from the group consisting of divalent hydrocarbon radicals, divalent hydrocarbon ether radicals, and divalent hydrocarbon amino radicals. A is at least one member selected from the group consisting of —S— and —$NR^2$—, where $R^2$ is hydrogen or alkyl of from one to six carbon atoms.

The adhesion promoter is a substituted trimethoxy silane compound. This compound comprises a trimethoxy silane base of the formula:

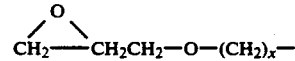

wherein $R^3$, $R^4$ and $R^5$ may be the same or different and are selected from alkyl and alkoxyl of from one to four carbon atoms, and wherein B is at least one member selected from the group consisting of:

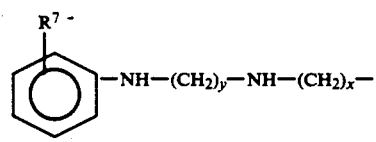

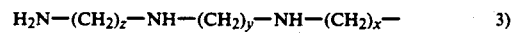

wherein x is an integer of from one to six, wherein $R^7$ is an alkyl group of from one to four carbon atoms or alkylene of one to four carbon atoms, and wherein y and z may be the same or different and are intergers of from one to six.

A more preferred process of the present invention provides a method of bonding fixed-window glass panels to a motor vehicle body. This process is carried out by:

a) applying a conventional electrocoat paint coating to the metal body of the motor vehicle;
b) applying masking means to those portions of the electrocoat painted motor vehicle body set aside to receive a bead of fixed-glass panel sealant;
c) applying one or more decorative and protective paint coatings to the masked motor vehicle body;
d) removing the masking means;
e) applying directly to the previously masked electrocoat painted portions of the motor vehicle body a bead of the polyurethane-based sealant composition of the present invention; and
f) affixing a glass window panel to the sealant bead.

In yet another embodiment, the present invention provides motor vehicles having fixed-window glass panels affixed directly to the electrocoat paint metal body of the motor vehicle by means of a polyurethane-based sealant composition of the present invention.

DETAILED DESCRIPTION

The sealant compositions of the present invention comprise a base silane-capped polyurethane polymer having a number average molecular weight in the range of from about 10,000 to about 30,000 having the structure

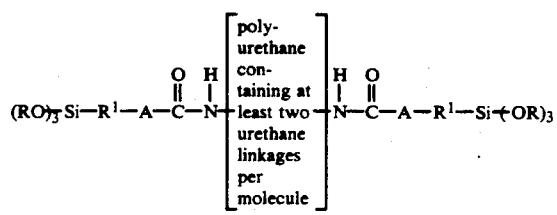

where R, R¹, and A are defined above. Such silane-capped polyurethane polymers are prepared by conventional polymerization techniques by reacting a polyether polyol having at least two free hydroxyl groups per molecule with an isocyanate compound having at least two isocyanate reactive groups per molecule as described in U.S. Pat. No. 3,979,344 to Bryant, et al. which is incorporated herein by reference.

The polyether polyol and isocyanate compound are reacted in a weight ratio of about 8:1 to about 12:1, respectively. The starting polyether polyol preferably has a number average molecular weight of between about 1,000 and 5,000. One such preferred starting material is polypropylene glycol available as Polypropylene Glycol 2025 from Union Carbide Co., 270 Park Avenue, New York, N.Y. 10017.

The starting isocyanate compound may be selected from a variety of materials known in the art for such purposes, such as p-phenylene diisocyanate, biphenyl-4,4'-diisocyanate, toluene diisocyanate (TDI), 3,3'-dimethyl-4,4'-biphenylene diisocyanate, 1,4-tetramethylene diisocyanate, 1,6-hexamethylenediisocyanate, 2,2,4-trimethylhexane-1,6-diisocyanate, methylene bis-(phenyl isocyanate), 1,5-naphthalene diisocyanate, isophorone diisocyanate (IPDI), and methylene bis-(4-cyclohexylisocyanate). The preferred material is toluene diisocycanate.

The copolymer formed by reaction of these two monomers is end-capped with a silane group having the structure —A—R¹—Si—(OR)₃. The group A is sulfur, >NH, or an alkylamino group in which the alkyl portion contains from one to six carbon atoms. The bridging group R¹ may be a divalent hydrocarbon radical, a divalent hydrocarbon radical containing one or more oxygen ether linkages, or a divalent hydrocarbon radical containing one or more >NH linkages. The end-capping of the polyurethane polymer is achieved by including in the reaction mixture containing the polyether polyol and isocyanate compound an aminosilane compound such as gamma-aminopropyltrimethoxysilane, gamma-aminopropyltriethoxysilane, and N-beta-aminoethyl-gamma-aminopropyltrimethoxysilane (available as A 1110, A 1100, and A 1120, respectively, from Union Carbide Corp., 270 Park Ave., New York, N.Y. 10017).

As used throughout this specification and the appended claims, the term "alkyl" means a hydrocarbon residue derived from branched or unbranched alkane by removal of a single hydrogen atom. The term "alkoxyl" denotes alkyl groups attached through an oxygen ether linkage to the remainder of the parent molecule. The term "divalent hydrocarbyl" means a branched or unbranched hydrocarbon group derived by removal of two hydrogen atoms from a saturated or unsaturated acyclic hydrocarbon. The term "divalent hydrocarbaryl" denotes a group derived from the removal of two hydrogen atoms from hydrocarbons containing one or more carbocyclic aromatic rings including phenyl, alkylphenyl, and phenylalkyl and the like. The term "divalent cyclohydrocarbyl" means a group derived by the removal of two hydrogen atoms from a carbocyclic non-aromatic hydrocarbon ring including cyclohexane, alkylcyclohexane, and the like.

The polyurethane base polymer is mixed with from about 2.0 to about 10.0 parts by weight, preferably from about 4.0 to about 8.0 parts by weight, (based on 100 parts by weight of the base polyurethane polymer) of an electrocoat adhesion promoting agent comprising an aminosilane, including hydrohalic salts thereof, of the structure

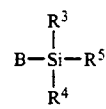

where B, x, R³, R⁴, and R⁵ are as previously defined. By hydrohalic salts is meant the hydrofluoride, hydrochloride, hydrobromide, and hydroiodide salts, with the hydrochloride salts being preferred.

Preferred electrocoat adhesion promoters using for the purposes of this invention include gamma-(glycidoxy)propyltrimethoxysilane, N-2-aminoethyl-N-3-aminoethyltrimethoxy-silylpropyl-1,2-ethanediamine (available from Union Carbide Corp., 270 Park Ave., New York, N.Y. 10017) and N-2-[4-vinyl-(benzeneamino)]ethyl-3-aminopropyltrimethoxysilane monohydrochloride (available as Z-6032 from Dow Corning Co., Midland, Mich.).

The composition further includes from about 20 to about 50 parts by weight of a pigmenting agent and/or filler such as carbon black, from about 0.02 to about 0.2 parts by weight of a curing catalyst, and from about 0.3 to about 0.6 parts by weight of an accelerator, all weights based on 100 parts by weight of the capped polyurethane polymer.

Suitable curing catalysts for purposes of this invention include metallic salts of tin, lead, mercury, or Group VIII elements; organo-iron, organo-tin (IV) and organo-lead compounds; aliphatic or aromatic carboxylic acids; toluenesulfonic acid; salts of organic acids such as tin naphthenate, tin octoate, tin butyrate, dibutyl tin diacetate, dibutyltin dioctoate, dibutyltin dilaurate, iron stearate, or lead octoate; and organic amines such as trialkylamines, N-substituted piperidines, N,N'-substituted piperazines, and pyridine. The preferred curing catalyst for compositions of the present invention is dibutyltin diacetate.

Suitable accelerating agents for use in the compositions of the present invention are titanate esters of the type disclosed in U.S. Pat. Nos. 4,600,689 and 4,623,738, the contents of which are incorporated herein by reference. It is preferred that the titanate esters which are employed as accelerators possess at least one primary or secondary amine group per molecule. Preferred materials include (4-aminobenzene)sulfanato-O, bis-(dodecylbenzene)sulfanato-O, 2-propanolato titanium (IV) (KR ®26S); 2-propanolato, tris-(3,6-diaza)hexanolato titanium (IV) (KR ®44); 2,2-bis-(2-propenolatomethyl)butanolato, tris-(2-ethylenediamino)ethylato titanium (IV) (Lica ®44); and 2,2-bis-(2-propenolatomethyl)butanolato, tris-(3-amino)phenylato titanium (IV) (Lica ®97), commercially available from Kenrich Petrochemicals, Inc., 140 East 22d Street, Bayonne, N.J. 07002). The preferred material is Lica ®44.

Additionally, small amounts, ranging from about 0.25 to about 0.75 parts by weight, of a thixotropic agent per 100 parts by weight of polyurethane polymer may also be added to adjust the flow characteristics of the sealant composition. A typical thixotropic agent suitable for this purpose is Thixseal ®1085 available from NL Chemicals, Inc., Heightstown, N.J. 08520.

Optionally, from about 1.0 to about 10.0 parts by weight of flexibilizing agent, preferably from about 2.0 to about 5.0 parts by weight, may be added to the composition, based on 100 parts by weight of the polyurethane base polymer. Suitable flexibilizing agents for inclusion in the compositions of the present invention include dioctyl phthalate, dibutyl phthalate, diundecyl phthalate (available under the Platinol ® line of plasticizers from BASF Corp., Paramus, N.J. 07652), and dioctyl adipate and butyl benzyl phthalate, isodecyldiphenyl phosphate (available as Santicizer ®160 and 148, respectively, from Monsanto Chemical Co., St. Louis, Mo. 63166), N-butyl-p-toluene-sulfonamide and N-ethyl-p-toluene-sulfonamide, (available as Ketjenflex ®8 from Akzo Chemie America, 300 South Riverside Plaza, Chicago, Ill. 60606).

While not holding to one particular theory to the exclusion of others, it is believed that when the two above-named sulfonamides, either alone or in admixture, are used in the compositions, they function both to flexibilize the composition and to promote adhesion.

The composition may also optionally include from about 5 to about 20 parts by weight, preferably about 10 parts by weight of a silane- or silicone-surface-treated clay, per 100 parts by weight of the base polymer. Because normal clays (e.g. magnesium and aluminum silicates) contain particle surface hydroxyl groups which are reactive toward the polymeric components of the sealant composition, the clays useful in formulating the sealants of this invention must be surface treated to cap the otherwise reactive hydroxyl groups. This is accomplished by treating the clay with a trialkylsilyl chloride or trialkoxysilyl chloride or mixed tri(alkyl/alkoxy)silyl chloride such as trimethylsilylchloride, trimethoxysilyl chloride, methyldimethoxysilyl chloride and the like.

Commercially available silane- or silcone-surface-treated clays useful in the compositions of this invention include the CB, 5178, KE, and 2211 clays available from Burgess, P.O. Box 349, Sanderville, Ga. 31082.

In the method of the present invention a motor vehicle body, such as an automobile, truck, or bus body which has been precleaned and/or surface pretreated (for example, by phosphatizing the metal surface), is coated with an electrocoat paint primer by conventional techniques well known in the art. This process is fully described, for example, in U.S. Pat. No. 4,575,523 to Anderson, et al., the contents of which are incorporated herein by reference. In general, the motor vehicle body to be electrocoated is connected to a direct current source in such a way that it acts as the cathode of an electrical circuit. The motor vehicle body is then immersed in a tank of a suitable aqueous electrodeposition bath which contains the counter electrode. The electrodeposition bath comprises an aqueous dispersion of a thermosetting resin which deposits on the motor vehicle body as a result of the passage of current. When a sufficiently thick layer of electrocoat primer paint has been applied to the motor vehicle body, the body is removed from the tank, rinsed, and the layer of electrocoat paint cured to a smooth, hard, durable coating.

In the next step of the method of this invention, the regions of the motor vehicle body which are destined to receive a bead of fixed-window panel sealant are masked by the application of a masking means such as a strip of tape or strippable polymeric material.

The masked, electrocoated motor vehicle body is then further coated with one or more decorative and/or protective paint coatings by conventional means such as air-spraying, airless spraying, electrostatic spraying, dipping, or brushing. These decorative and/or protective coatings may take the form of one or more pigmented coating layers (topcoat system), or one or more thin, pigmented basecoat layers with one or more overlying layers of clear topcoat (basecoat/clearcoat coating system).

Following the application and curing of the decorative/protective coating layers, the masking means is removed from the motor vehicle body, and a bead of polyurethane-based sealant composition of this invention is applied directly to the electrocoat paint layer in this regions of the motor vehicle body previously masked. In the final step, a fixed-window glass panel is pressed into contact with the sealant bead and the sealant is permitted to cure.

The following examples are provided to permit those skilled in the art to practice the present invention. The example are merely illustrative and are not to be read as limiting the scope of the invention as defined by the appended claims.

Preparation of the Polyurethane Base Polymer Composition

A silane-capped polyurethane polymer of the type described in U.S. Pat. No. 3,632,557 was prepared as follows:

| A. Niax PPG 2025 ONE | 2001.00 g |
| --- | --- |
| (2000 Molecular weight polyether polyol available from Union Carbide Corp., 270 Park Ave., New York, NY 10017) | |
| Hylene TM | 204.00 g |
| (80:20 Grade toluene diisocyanate available from E. I. duPont deNemours & Co., Wilmington, DE 19898) | |
| Glacial acetic acid | 0.55 g |
| Dibutyltin diacetate | 0.45 g |
| B. Anhydrous toluene | 110.00 g |
| C. Anhydrous toluene | 81.00 g |
| Silane A 1110 | 68.30 g |
| (gamma-Aminopropyl)trimethoxy silane available from Union Carbide Corp., 270 Park Ave., New York, NY 10017) | |
| D. Anhydrous methanol | 273.00 g |

The components of A above were mixed and heated to 155° F. (68.3° C.) under anhydrous conditions and maintained at that temperature for fifty-five minutes. At the end of that time, B was added. Over the next forty-five minutes, the temperature of the mixture was gradually reduced to 105° F. (40.6° C.) and heating was continued for two and one-quarter hours. At the end of this time, C was added to the mixture and the resulting mixture was heated at 150°–165° F. (65.6°–73.9° C.) for an additional two and one-quarter hours. During this time, samples of the reaction mixture were tested for free isocyanate functional groups. When the tests indicated no residual free isocyanate, D was added and the mixture heated under reflux for a short time. The mixture was degassed and cooled to room temperature.

Preparation of Sealant Compositions of the Present Invention

Example 1

A five-gallon Myers mixer fitted with dual mixing blades was charged with 25 lb (11.34 kg) of the base polyurethane polymer prepared as described above. The mixer contents were heated to 65° C. and 1.72 lb (0.78 kg) of the electrocoat adhesion promoter, N-2-[4-vinyl(benzeneamino)]ethyl-3-aminopropyltrimethoxysilane monohydrochloride (available as Z-6032 from Dow Corning Co., Midland, Mich.), 1.1 lb (0.5 kg) of anhydrous methanol, and 0.11 lb (0.5 kg) of neopentyl(-diallyl)-oxytri(N-ethyleneamino)ethyl titanate (available as LICA ®44 from Kenrich Petrochemicals, Inc., 140 East 22nd Street, Bayonee, N.J. 07002) were added. This mixture was thoroughly blended by mixing for 10 minutes under slight vacuum.

To the above mixture was then added 12.0 g of dibutyl tin diacetate catalyst and mixing was continued for an additional 20 minutes under slightly reduced pressure. Carbon black (7.5 lb, 3.4 kg) and 2.5 lb (1.13 kg) of surface treated aluminum silicate clay (available from Burgess CB, P.O. Box 349, Sanderville, Ga. 31082) which had been previously dried to less than 0.05% by weight moisture content, were added to the sealant mixture and mixing was continued for an additional 45 minutes under slight vacuum.

The mixer contents were allowed to cool to room temperature and then packaged under anhydrous conditions. The final sealant had the following composition, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 780 | 6.88 |
| Methanol | 500 | 4.42 |
| LICA ® 44 | 50 | 0.44 |
| Dibutyltin diacetate | 12 | 0.11 |
| Carbon black | 3400 | 29.98 |
| Surface treated aluminum silicate clay | 1130 | 9.97 |

The black, homogeneous moisture-curable sealant composition had a viscosity of 60 seconds when extruded from a 0.104 inch (2.64 mm) orifice under a pressure of 60 psi (413.7 kPa) and 76° F. (24.4° C.).

Example 2

A sealant composition was prepared in accordance with the composition and method of Example 1, but containing a reduced amount (0.585 kg) of the electrocoat adhesion promoter N-2-[4-vinyl(benzeneamino)]ethyl-3-aminopropyltrimethoxysilane monohydrochloride. The composition had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 585 | 5.16 |
| Methanol | 500 | 4.41 |
| LICA ® 44 | 50 | 0.44 |
| Dibutyltin diacetate | 12 | 0.11 |
| Carbon black | 3400 | 29.98 |
| Surface treated aluminum silicate clay | 1130 | 9.96 |

Example 3

A sealant composition was prepared in accordance with the composition and method of Example 1, but containing an increased amount (0.975 kg) of the electrocoat adhesion promoter N-2-[4-vinyl(benzeneamino)]ethyl-3-aminopropyltrimethoxysilane monohydrochloride. The composition had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 975 | 8.60 |
| Methanol | 500 | 4.41 |
| LICA ® 44 | 50 | 0.45 |
| Dibutyltin diacetate | 12 | 0.11 |
| Carbon black | 3400 | 29.98 |
| Surface treated aluminum silicate clay | 1130 | 9.95 |

Example 4

Following the method of Example 1, a sealant composition was prepared which further contained 0.5 lb (0.23 kg) of a 50/50 mixture of N-butyl-p-toluenesulfonamide and N-ethyl-p-toluene-sulfonamide (available as Ketjenflex ®8 from Akzo Chemie America, 300 South Riverside Plaza, Chicago, Ill. 60606) as a flexibilizing agent. The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 780 | 6.88 |
| Methanol | 500 | 4.42 |
| LICA ® 44 | 54 | 0.48 |
| Dibutyltin diacetate | 12 | 0.11 |
| Flexibilizing agent (Mixture of sulfonamides) | 230 | 2.03 |
| Carbon black | 3,400 | 29.98 |
| Surface treated aluminum silicate clay | 1,130 | 9.96 |

Example 5

A sealant composition was prepared in accordance with the composition and method of Example 1 but further containing 0.5 lb (0.23 kg) of a di-iso-decyl phthalate as a plasticizing agent. The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 780 | 6.88 |
| Methanol | 500 | 4.42 |
| LICA ® 44 | 50 | 0.44 |
| Dibutyltin diacetate | 12 | 0.11 |
| Flexibilizing agent (Di-iso-decylphthalate) | 230 | 2.03 |
| Carbon black | 3,400 | 29.98 |
| Surface treated aluminum silicate clay | 1,130 | 9.96 |

Example 6

A sealant composition was prepared in accordance with the composition and method of Example 1, but containing as the adhesion promoting agent a mixture of 0.35 lb (0.16 kg) of N-2-aminoethyl-N-3-aminoethyl-trimethoxy-silylpropyl-1,2-ethanediamine and 0.15 lb (0.07 kg) of N-beta-aminoethyl-gamma-aminopropyl-trimethoxysilane (available as A 1130 and A 1120, respectively, from Union Carbide Corp., 270 Park Ave., New York, N.Y. 10017). The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Mixture of A 1130 and A 1120) | 230 | 2.03 |
| Methanol | 500 | 4.42 |
| LICA ® 44 | 50 | 0.44 |
| Dibutyltin diacetate | 12 | 0.11 |
| Carbon black | 3400 | 29.98 |
| Surface treated aluminum silicate clay | 1130 | 9.97 |

Example 7

A sealant composition was prepared in accordance with the composition and method of Example 1, but containing as the adhesion promoting agent 0.5 lb (0.23 kg) of N-2-aminoethyl-N-3-aminoethyltrimethoxysilyl-propyl-1,2-ethanediamine (available as A 1130 from Union Carbide Corp., 270 Park Ave., New York, N.Y. 10017). The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (A 1130) | 230 | 2.03 |
| Methanol | 500 | 4.42 |
| LICA ® 44 | 50 | 0.44 |
| Dibutyltin diacetate | 12 | 0.11 |
| Carbon black | 3400 | 29.98 |
| Surface treated aluminum silicate clay | 1130 | 9.97 |

Example 8

A sealant composition was prepared in accordance with the method of Example 1, but with the following composition. The adhesion promoting agent used was 2:1 lb (0.95 kg) of gamma-(glycidoxy)propyltrimethoxysilane, available from Union Carbide Corp., 270 Park Ave., New York, N.Y. 10017). The sealant had the following composition in parts by weight, normalized to 100 parts by weight of the base polyurethane polymer.

| Component | Grams | Parts by Weight Per 100 Parts of Base Polymer |
|---|---|---|
| Base polyurethane | 11,340 | 100 |
| polymer | | |
| Electrocoat adhesion promoter | 950 | 8.38 |
| Methanol | 950 | 8.38 |
| LICA ® 44 | — | — |
| Dibutyltin diacetate | 12 | 0.11 |
| Carbon black | 3400 | 29.98 |
| Surface treated aluminum silicate clay | 1130 | 9.97 |

Testing Procedures

The lap shear strength of the materials prepared in accordance with the above Examples were tested according to the following method. In each instance, pairs of shear strength test plates were prepared by bonding two previously electrocoat primed steel plates, each 1 inch by 0.32 inches (2.54 cm × 0.81 cm), with a sealant bead 1 inch long by 0.25 inches wide by 5/16 inches thick (2.54 cm × 0.64 cm × 0.79 cm). The sealant bead was applied along one of the one-inch edges of the test plates by means of a sealant tube. The plates were then pressed together so that the sealant bead was about 0.25 inches (0.64 cm) thick.

The sealant bead applied to the bonded test plates was allowed to cure at room temperature and 50% relative humidity for periods which varied between three hours and three days. After the appropriate cure time in each case, the shear strength of each sealant bead was tested on an Instron testing machine by pulling in a direction parallel to the faces of the bonded test plates. The results of these tests, along with other properties of the tested compositions, appear in the following Table.

TABLE
Shear Strength and Properties of Sealant Compositions of The Present Invention

| Example | Lap Shear Strength | | Shore A Hardness |
|---|---|---|---|
| | (After 3 Hours) | (After 3 Days) | |
| 1 | 100 psi (689.5 kP) | 845 psi (5826 kP) | 61 |
| 2 | 85 psi (586.1 kP) | 700 psi (4826 kP) | 60 |
| 3 | 97 psi (668.8 kP) | 825 psi (5688 kP) | 59 |
| 4 | 110 psi (758.4 kP) | 900 psi (6205 kP) | 54 |
| 5 | 115 psi (792.9 kP) | 815 psi (5619 kP) | 62 |
| 6 | 105 psi (723.9 kP) | 888 psi (6123 kP) | 67 |
| 7 | 20 psi (137.9 kP) | 325 psi (2241 kP) | 48 |

We claim:

1. A one-component, primerless, moisture-curable sealant composition for bonding glass directly to electrocoated metal substrates comprising a mixture of:

(a) a silane-terminated polyurethane polymer of the formula

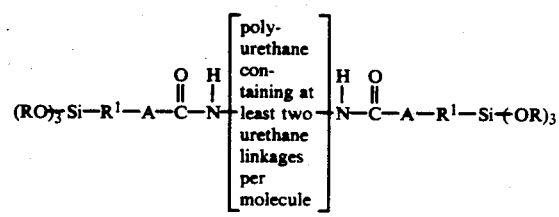

wherein R is lower alkyl of from 1 to 6 carbon atoms; $R^1$ is a divalent bridging radical selected from the group consisting of divalent hydrocarbon radicals, divalent hydrocarbon ether radicals, and divalent hydrocarbon amino radicals; and A is —S— or —NR$^2$— where R$^2$ is hydrogen or alkyl of from one to six carbon atoms; and (b) a substituted trimethoxy silane electrocoat adhesion promoter comprising a trimethoxy silane base of the formula:

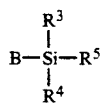

wherein R$^3$, R$^4$, and R$^5$ may be the same or different and are alkyl or alkoxyl of from one to four carbon atoms, and wherein B is at least one member selected from the group consisting of:

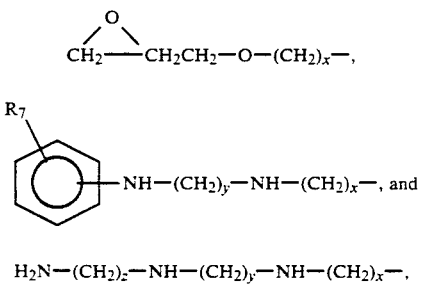

wherein R$^7$ is alkyl of one to four carbon atoms or alkylene of one to four carbon atoms; and x, y, and z each independently represents an integer of from one to six.

2. A one-component, primerless, moisture-curable sealant composition as defined in claim 1 wherein said polyurethane polymer is the reaction product of a polyether polyol containing at least two hydroxyl groups per molecule and a number average molecular weight of about 1000 to about 3000 and an isocyanate having at least two isocyanate groups per molecule.

3. A one-component, primerless, moisture-curable sealant composition as defined in claim 1 wherein said polyurethane polymer has a number average molecular weight of from about 10,000 to about 30,000.

4. A one-component, primerless, moisture-curable sealant composition as defined in claim 3 wherein A is —NR$^2$— where R$^2$ is as defined therein.

5. A one-component, primerless, moisture-curable sealant composition as defined by claim 1 wherein said electrocoat adhesion promoter is present in an amount of between about 2.0 to about 10.0 parts by weight, based on 100 parts by weight of said polyurethane polymer.

6. A one-component, primerless, moisture-curable sealant composition as defined by claim 5 wherein said electrocoat adhesion promoter is present in an amount of between about 4.0 to about 8.0 parts by weight, based on 100 parts by weight of said polyurethane polymer.

7. A one-component, primerless, moisture-curable sealant composition as defined by claim 5 wherein said electrocoat adhesion promoter is selected from the group consisting of
gamma-(glycidoxy)propyltrimethoxysilane,
N-2-aminoethyl-N-3-aminoethyltrimethoxysilylpropyl-1,2-ethanediamine, and
N-2-[4-vinyl-(benzeneamino)]ethyl-3-aminopropyltrimethoxysilane,
including hydrohalide salts thereof and mixtures thereof.

8. A one-component, primerless, moisture-curable sealant composition as defined in claim 1 further containing from about 1.0 to about 10.0 parts by weight of a flexibilizing agent, based on 100 parts by weight of said polyurethane polymer.

9. A one-component, primerless, moisture-curable sealant composition as defined in claim 5 wherein said flexibilizing agent is present in an amount of from about 2.0 to about 5.0 parts by weight, based on 100 parts by weight of said polyurethane polymer.

10. A one-component, primerless, moisture-curable sealant composition as defined in claim 9 wherein said flexibilizing agent is selected from the group consisting of dioctyl phthalate, dibutyl phthalate, diundecyl phthalate, dioctyl adipate, butyl benzyl phthalate, isodecyldiphenyl phosphate, di-iso-decyl phthalate, N-butyl-p-toluene-sulfonamide and N-ethyl-p-toluene-sulfonamide and mixtures thereof.

11. A one-component, primerless, moisture-curable sealant composition as defined in claim 1 wherein said electrocoat adhesion promoter is N-2-[4-vinyl(benzeneamino)]ethyl-3-aminopropyltrimethoxysilane, monohydrochloride.

* * * * *